United States Patent [19]

Drobnicki et al.

[11] Patent Number: 5,262,784
[45] Date of Patent: Nov. 16, 1993

[54] SYSTEM FOR MONITORING AIRCRAFT POSITION

[75] Inventors: Paul F. Drobnicki, Holbrook; Carl E. Schwab, Huntington Station, both of N.Y.; Fred N. S. Goodrich, Barnstead, N.H.

[73] Assignee: Cardion, Inc., Woodbury, N.Y.

[21] Appl. No.: 898,654

[22] Filed: Jun. 15, 1992

[51] Int. Cl.$^5$ .............................. G01S 13/80
[52] U.S. Cl. ............................ 342/45; 342/46
[58] Field of Search .......................... 342/45, 46

[56] References Cited

U.S. PATENT DOCUMENTS 5,144,315 9/1992 Schwab et al. ............... 342/49

*Primary Examiner*—Daniel T. Pihulic
*Attorney, Agent, or Firm*—Pollock, Vande Sande & Priddy

[57] ABSTRACT

A system for locating and identifying aircraft while on an airport. Each aircraft has an IFF transponder which is interrogated from on board the aircraft to produce replies at a slower rate than normal interrogation rates. A plurality of receiving stations at different locations about the airport measure the time of arrival of the replies and decode the replies. The time of arrival information is forwarded to a central receiving station along with the decode reply data. Using conventional correlation techniques, the location of each aircraft is established through the time of arrival information as well as the identity of the aircraft from the decoded reply data.

11 Claims, 4 Drawing Sheets

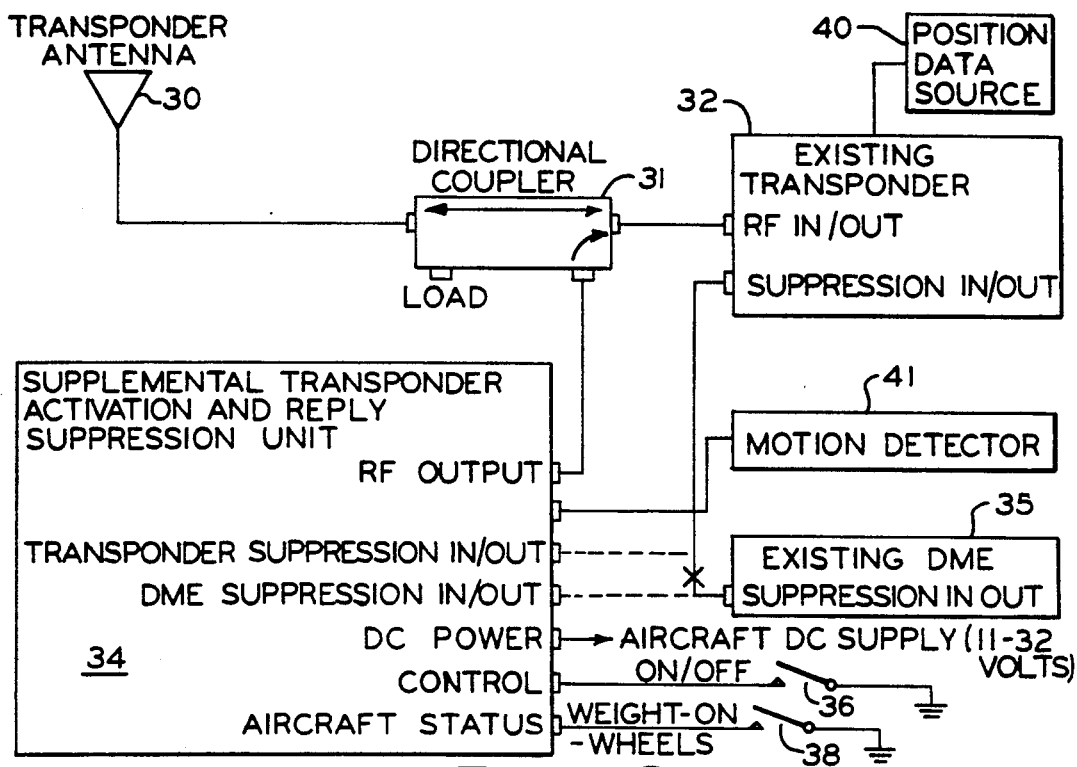
FIG. 2
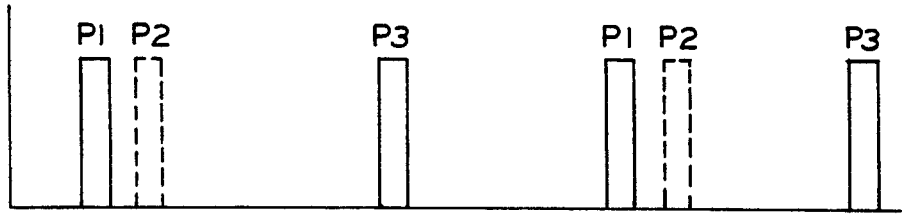
FIG. 3
TRANSPONDER REPLY CODES
| | | |
|---|---|---|
| AVAILABLE PULSE POSITIONS | ⎍⎍⎍⎍⎍⎍⎍⎍⎍⎍⎍⎍⎍⎍ ⎍ | |
| SPACING (μ sec) | 1.45  4.35  7.25  10.15  13.05  15.95  18.85    24.65 | |
| LEADING EDGE TO LEADING EDGE | 0   2.9   5.8   8.7  11.6   14.5   17.4   20.3 | |
| DESIGNATION OF PULSES | FRAMING C₁ A₁ C₂ A₂ C₄ A₄ X  B₁ D₁ B₂ D₂ B₄ D₄ FRAMING<br>F₁                                                           F₂   SPI | |
| RECOMMENDATION 4096 CODES | ⎍⎍⎍⎍⎍⎍⎍⎍ ⎍⎍⎍⎍⎍⎍ ⎍<br>F1  F2 | |
FIG. 4

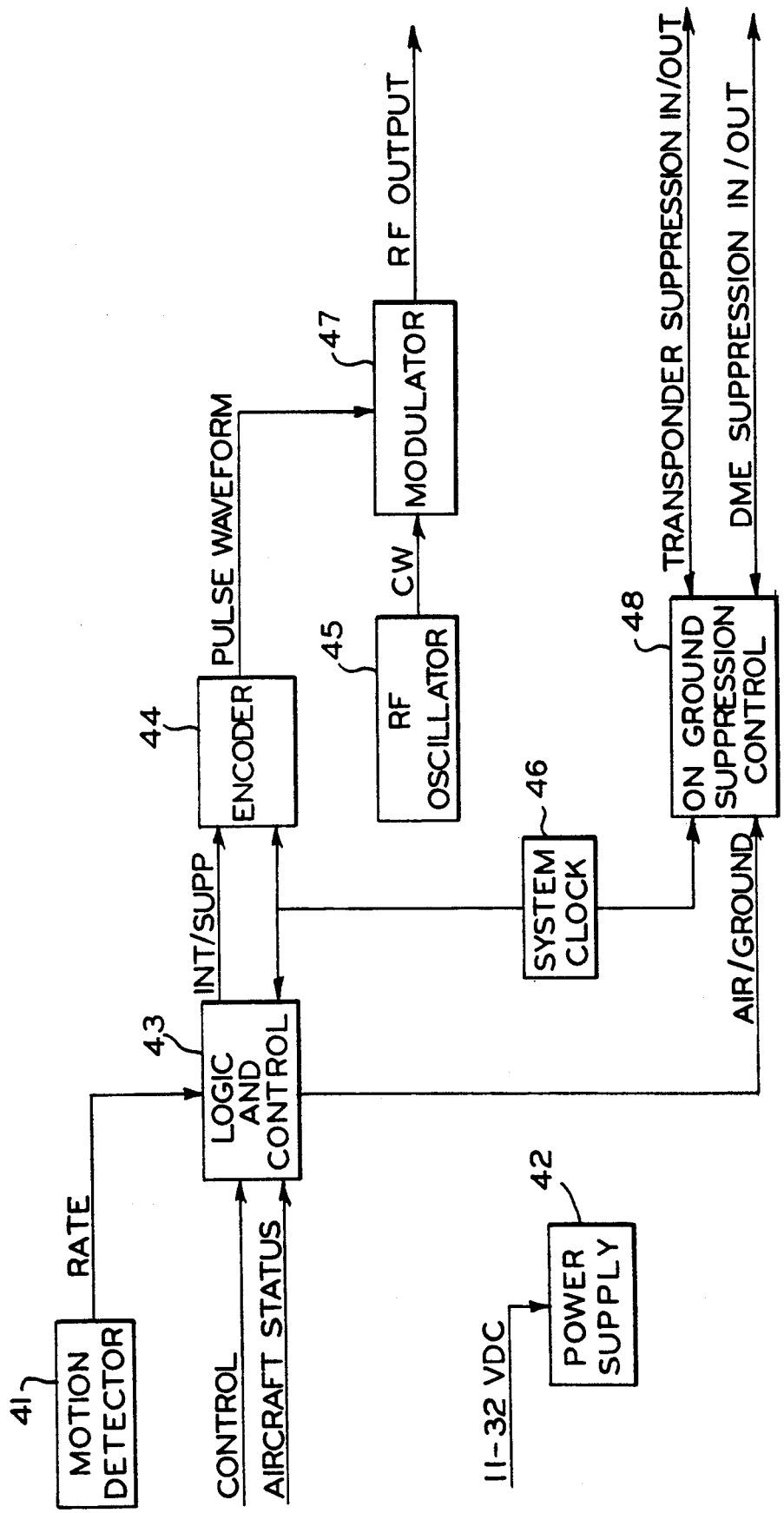
FIG_5

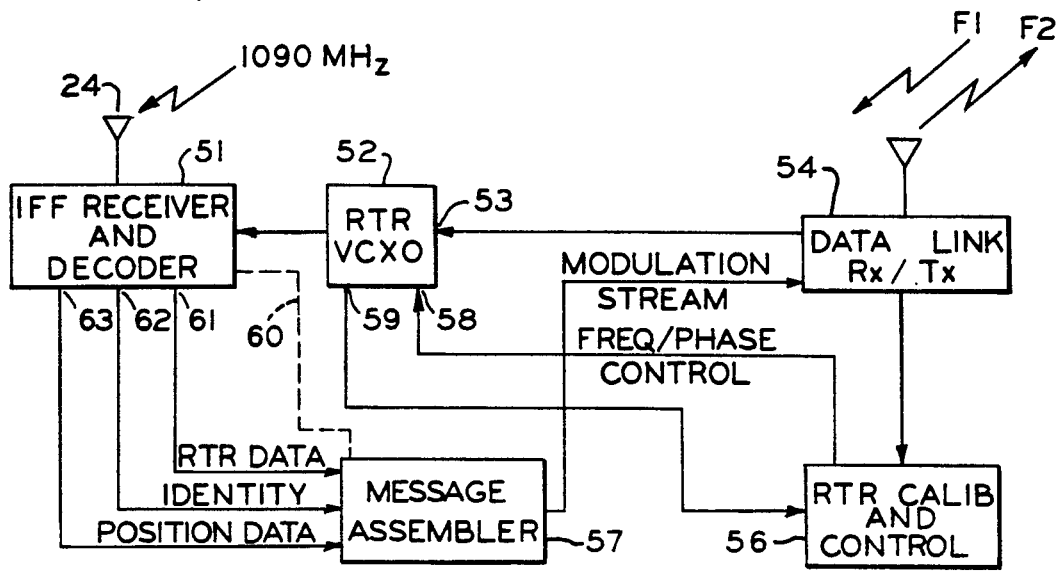
FIG_6
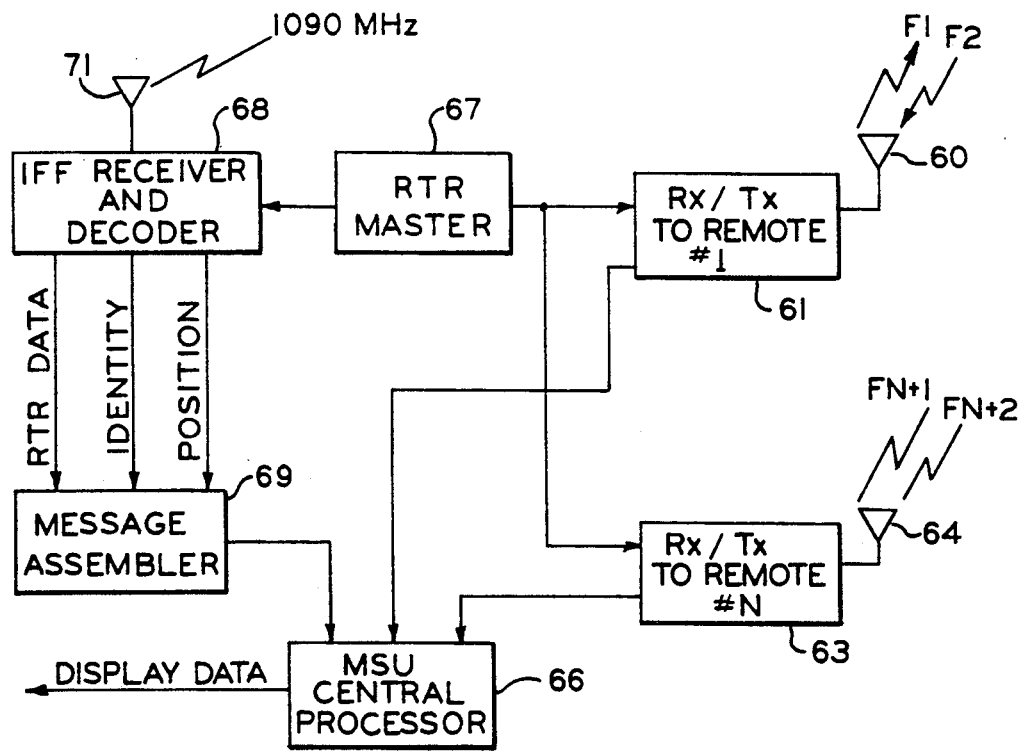
FIG_7

SYSTEM FOR MONITORING AIRCRAFT POSITION

Related Patent Applications

This application is related to U.S. patent application Ser. No. 07/625,040 filed Dec. 10, 1990, now U.S. Pat. No. 5,144,315.

Background of the Invention

The present invention relates to aircraft position monitoring systems for monitoring aircraft which are on the ground. Specifically, a system for identifying the location of aircraft which are on the ground using conventional on-board IFF transponder equipment is described.

Air traffic control systems for modern aircraft include IFF equipment which will interrogate aircraft approaching an airport on a regular basis. The interrogations result in replies being emitted by each of the aircraft transponders to identify the height and identity of each aircraft making an approach to an airport. Once the aircraft has landed, the transponders are disabled so as to avoid generating fruit and garbling replies in response to further interrogations of approaching aircraft. The disabled transponder mechanisms, while useful for air traffic control purposes during flight and subsequent approach to an airport are disabled and are not capable of functioning to locate the position of grounded aircraft.

Even though aircraft are on the ground, it is still necessary to accurately monitor their position to insure safety during movement of the aircraft. Various proposals have been provided which would permit the aircraft to be accurately monitored once it is on the ground so that air traffic control would know the whereabouts of all aircraft, whether approaching or already landed at the airport.

One technique for monitoring aircraft which has reached the ground is a surveillance ASDE (Airport Surface Detection Equipment) radar which provides a PPI display of the local airport and the position of various aircraft on the runways and other surface areas of the airport. These radars scan approximately once per second, which will locate various structures throughout the airport. The ASDE radar cannot determine identity information for each displayed aircraft so that air traffic control cannot quickly identify a particular aircraft whose position is important in assuring safe ground traffic control.

The present invention is directed towards causing the IFF transponders to emit without external interrogation of the transponders, aircraft position information during the time the aircraft is on the ground. Use of the transponders must be such that the replies generated by these transponders do not interfere with transponder replies from airborne aircraft that are issuing replies.

Summary of the Invention

It is an object of this invention to provide for a system for deriving aircraft position when the aircraft is on the ground.

It is a more specific object of this invention to provide for the existing aircraft IFF transponder equipment which is normally disabled when not in flight to permit location of the aircraft after landing.

These and other objects of the invention are provided by a system augmentation of conventional aircraft IFF transponder equipment. The additional equipment will permit IFF transponders to initiate on a pseudo-random basis replies at a rate which will not produce an undue amount of garble and fruit.

The system contemplates a circuit which will inhibit interrogation of the IFF transponders from a local high power interrogator. A local interrogating device is located on each aircraft which will produce replies from the aircraft transponder at a lower rate than is normally obtained from ground interrogation of the IFF transponder.

The locally-interrogated transponder will initiate a reply indicating the aircraft's identity. Each receive station spaced about the airport will decode the reply to obtain the identity information.

In the preferred embodiment of the invention, three receive stations will determine a time of arrival of each reply generated by the aircraft. The time of arrival information obtained at the three stations is transferred to a center processor. The three time of arrival measurements are used to determine the location of each aircraft. The Central Processor may be located at any one of the receive stations or located separately.

The spatial location of each aircraft determined from the time of arrival data can be superimposed on the display of ASDE radar responsible for monitoring airport ground conditions. The ASDE radar display of the airport vicinity may also be supplemented with the identity information generated from each reply.

Description of the Figures

FIG. 2 illustrates how the supplemental transponder actuation and reply suppression unit 34 interfaces with the existing aircraft transponder equipment to provide for on-board interrogation of the transponders.

FIG. 3 illustrates the interrogation pulses generated on board each aircraft.

FIG. 4 illustrates a reply which is obtained from the interrogation pulses of FIG. 3.

FIG. 5 illustrates a block diagram of the supplemental transponder actuation and reply suppression unit 34 which provides for onboard interrogation of the IFF transponder.

FIG. 6 illustrates a receive station for measuring the time of arrival of aircraft replies.

FIG. 7 illustrates the Central Processor for collecting the time of arrival information from receive stations 16, 17 and 18 of FIG. 1.

Description of the Preferred Embodiment

Figure 1:
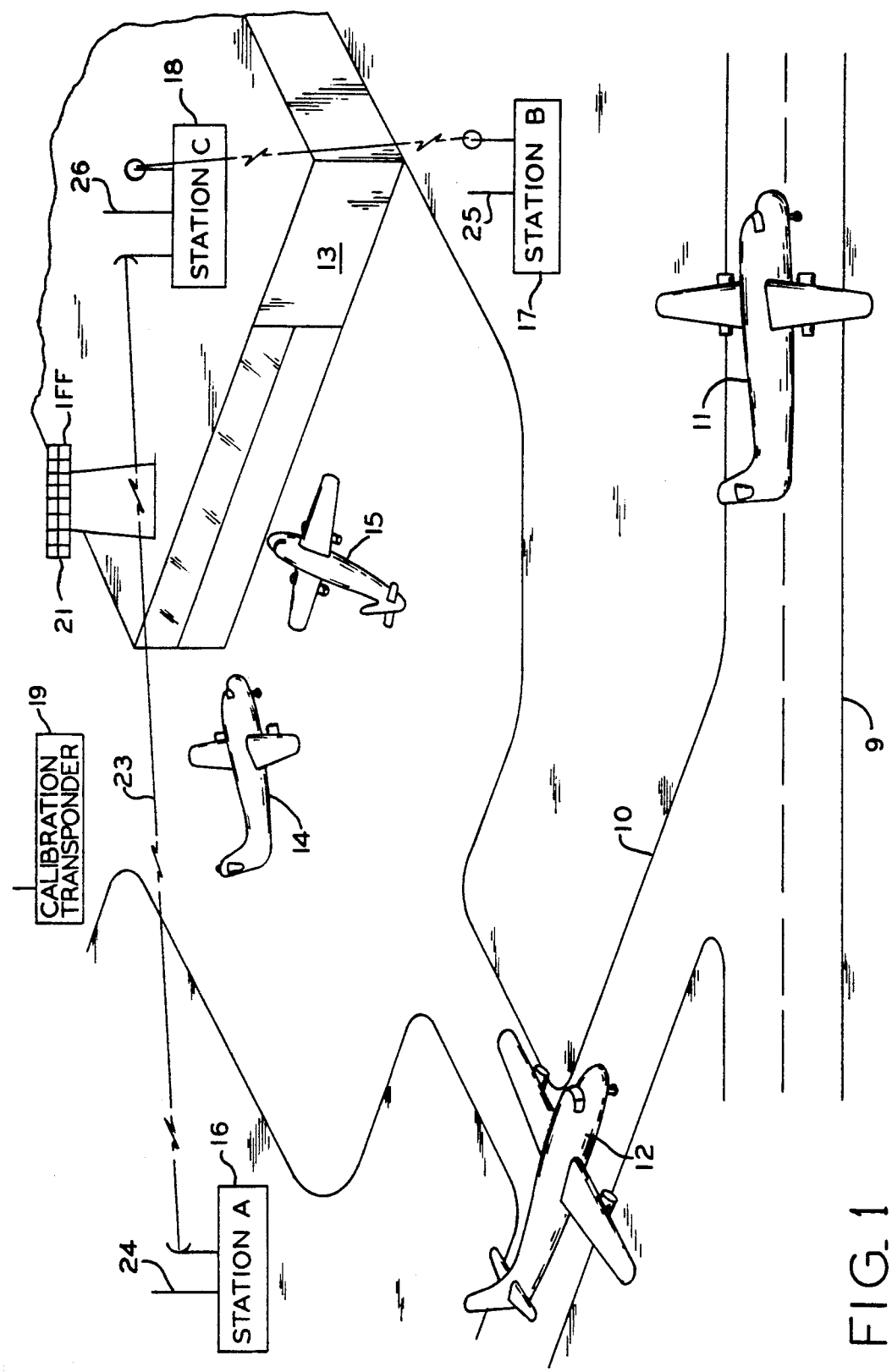
FIG. 1 illustrates the layout of an airport having a plurality of aircraft whose position is to be constantly monitored.

Referring now to FIG. 1, there is shown the general layout of an airport where aircraft may be landing and taking off. An IFF interrogator 21 is included which will interrogate the IFF transponder of aircraft entering the air space of the airport. The IFF transponders aboard each aircraft reply in response to these interrogations to supply the data for air traffic controllers to schedule landings to the airport.

The airport facility might include an aircraft 11 taxiing on runway 9, another aircraft 12 approaching via access runway 10, waiting for take-off as well as several stationary aircraft 14 and 15. In order to properly account for the location of each aircraft on the ground, the present invention has been provided. Normally, the IFF transponders of each aircraft 11, 12, 14 and 15 would be disabled until the aircraft is airborne. As a result, the IFF interrogator 21 does not generate any replies from these aircraft while on the ground.

The transponders on board each aircraft 11, 12, 14 and 15 are inhibited from replying to an interrogation issued by the ground interrogator 21. The suppression of replies from aircraft which are on the ground is needed in order to avoid producing an excessive amount of fruit and garble which could interfere with replies from airborne aircraft making an approach to the airport facility.

The present invention contemplates providing on each of the aircraft 11, 12, 14 and 15 on-board interrogation equipment to interrogate the IFF transponders at a rate considerably lower (nominally at 1 second intervals) than the interrogation rate of high power ground interrogator 21. The lower rate replies are received at three separate receiving stations, 16, 17 and 18.

The two remaining stations 16, 17 and 18 are linked via a communication link 22 and 23 to the center processor at station 18. Each of the stations 16, 17, 18 measures the time of arrival information for the replies issued by the aircraft on the ground. Each of the stations includes an antenna 24, 25 and 26 for receiving the replies and decoding circuitry to obtain the identity as well as the time of arrival of the replies.

As is well known, the time of arrival information from three separate receiving stations 16, 17 and 18 can be correlated to identify the precise location of a radiating source, which in this case, is an aircraft issuing IFF replies.

The receive stations 16, 17 and 18 will forward the reply time of arrival measurements and the corresponding decoded identity for the reply to master station 18. The Central Processor which may be located at station 18 will compute the aircraft position based on time of arrival information and supply the position coordinates to a display radar for monitoring the position of the aircraft. The identity of each aircraft may also be superimposed over each displayed aircraft position.

The on-board interrogation equipment for each aircraft is illustrated in the block diagram of FIG. 2. The conventional IFF transponder 32 is connected to its respective antenna 30 through a directional coupler 31. An existing DME suppression circuit 35 suppresses the transponder operation when the aircraft is on the ground.

A Supplemental Transponder Activation and Reply Suppression (STARS) unit 34 is shown which will keep the existing aircraft IFF transponder from responding to interrogation pulses received from the transponder antenna 30. An RF output from the supplemental transponder and activation and reply supply suppression unit 34 will supply interrogation pulses to the existing transponder 32 via the directional coupler 31. Thus, the existing transponder is held in a muted condition until the supplemental transponder activation and reply suppression unit initiates a set of interrogation pulses P1 and P3, through the coupler 31 to illicit an appropriate mode response from the existing transponder 32. The identity reply, mode A, is issued when the P1 and P3 pulses are spaced 8 microseconds apart.

The RF output is also configured to apply a P2 pulse for suppressing the existing transponder between local interrogation of the transponder. Thus, the P2 pulse, having an amplitude which the existing transponder recognizes as being a suppression condition will effectively maintain the existing transponder in a muted mode when receiving any interrogation pulses from the ground interrogator 21 of FIG. 1.

Additional to the supplemental transponder activation and reply suppression unit 34 is a weight on wheels switch 38. This switch will cause the Supplemental Transponder Activation and Reply Suppression (STARS) unit 34 to suppress external interrogation when the aircraft is on the ground. A control on/off switch 36 will additionally manually permit disablement of the unit 34.

Existing transponder 32 and DME unit 35 are interconnected as shown to implement the present invention. The DME suppression in/out control signal line is therefore under control of the unit 34. Thus, the suppression in/out command to existing transponder 32 will only be applied when the weight on wheels 38 and on/off switch 36 are closed.

The interrogation pulse set generated on board the aircraft by unit 34 will occur at a nominal 1 second rate in a preferred embodiment. This rate will vary, pseudo-randomly about the nominal 1 second rate to reduce the probability of collisions with other aircraft replies. Additionally, an acceleration detector 41 is shown which, when the aircraft is accelerating abnormally, will result in the nominal rate increasing such that reply data will be received at a greater rate corresponding to the movement of the aircraft.

It is contemplated that in some embodiments additional interrogation modes other than a mode A interrogation will be made of the existing transponder 32. These additional interrogations of the transponder 32 may generate a reply including locally generated data on the aircraft. This locally generated data could be position data obtained from a position data source 40. The position information can be obtained through any number of navigation and position determining systems, specifically satellite global positioning systems. Aircraft equipped with such systems can therefore transmit along with their identity a reply indicating the position of the aircraft.

The interrogation pulses generated by the supplemental transponder activation and reply suppression unit are at the nominal 1.030 GHz frequency of the existing transponder 32 interrogation frequency. As shown in FIG. 3, a P1 and P3 pulse are applied at the correct spacing to elicit the mode A reply or an additional reply from the existing transponder 32. The P2 pulse is shown..which,, when inserted by the supplemental transponder activation unit 34, suppresses response by the existing transponder 32. During non-active intervals between the intervals in which the transponder 32 is locally interrogated, P1, P2 and P3 are applied with the P2 pulse having an amplitude equal to P1, resulting in the suppression of any reply from existing transponder 32 in response to interrogation from the high power interrogator 21. Additionally, the DME suppression signal may be applied to the suppression input/output terminal of existing transponder 32.

The reply initiated from an interrogation according to FIG. 3 is shown in FIG. 4. The reply will be recognized by those familiar with IFF communications as a standard reply having the pulses' positions shown.

FIG. 5 is a block diagram of the supplemental transponder activation and reply suppression unit 34. The unit includes an RF oscillator 45 for generating a continuous wave carrier signal within the passband of the transponder 32. A modulator 47 will modulate the RF carrier signal with the interrogation pulses P1 and P3, as well as the suppression pulse P2 for rendering the transponder inactive.

The encoder 44 generates the required interrogation pulses P1, P2 and P3. A system clock 46 will supply the clocking signals for logic and control circuit 43/ the ground suppression control circuit 48, and the encoder 44.

Depending upon the aircraft status signals provided by weight on wheels switch 38, and the state of on/off switch 36, a pulse is supplied at approximately 1 second intervals to the encoder 44. The encoder 44 will initiate a train of pulses having the format of interrogation pulses P1, P2 and P3 to modulator 47. The acceleration detector 41 will modulate the pseudo-random rate of the pulse set supplied to the encoder 44 which will increase from a nominal 1 second rate.

The on-board interrogation signal produced by modulator 47 can have the format for a mode A interrogation to provide the identity of the aircraft, as well as to provide for additional mode interrogations. It is contemplated that in the future it may be desirable to elicit on-board derived position data which can be transmitted by an elicited reply from the transponder. The encoder 44 can thus be configured for any type of mode interrogation.

The on-ground suppression control circuit 48 supplies a transponder suppression signal in response to the received DME suppression input signal. This DME suppression is implemented in addition to RF pulse suppression when the logic and control circuit 43 provides an enabling signal to the on-ground suppression control circuit 48.

Thus, it is seen that on-board interrogations may result which will generate any reply within the capability of the aircraft transponder. During periods in which the on-board interrogation is not active, the ground suppression control circuit 48 and encoder 44 will apply suppression signals to both the DME suppression input/output terminal of the transponder and the RF input of the transponder via coupler 31.

The on-board generated interrogations and corresponding replies from each of the aircraft transponders are received at each of the three receiving locations in the airport. FIG. 6 illustrates a block diagram of such a receiving station which will measure the time of arrival of a reply issued from an aircraft, as well as decode the reply to obtain the identity of the aircraft. FIG. 6 is illustrative of one method of RTR calibration; those skilled in the art will recognize alternate calibration means such as having calibration transponder 19 at a known location in the airport area as described in our earlier co-pending patent application Ser. No. 07/625,040 now U.S. Pat. No. 5,144,315. Any position data which also may be contained in a reply is decoded and forwarded via a data link 54 to the Central Processor located at station 18 of FIG. 1.

The standard IFF receiver and decoder 51 receives and decodes each of the replies. The receiver 51 can provide identity and position data contained in a reply as decoded output data. The time of arrival of the reply is measured and appears on output port 61.

The time of arrival data is that time noted by the IFF receiver when framing pulses of a reply are received. A counter within the IFF receiver 51 will note the occurrence of each pulse event and will be cleared following the successful decode of both identity and any position data. Thus, a time of arrival for the reply is computed based on a running average of framing pulse arrivals or on the arrival of any of the identity or position data selected by the system designer.

A message assembler 57 will compose the real time arrival data, identity data and any subsequent position data in a frame for transmission via the data link to the master station. A decoded output 60 may also be provided which represents the motion detector signal used to modulate the rate of interrogation. Output port 60 will permit the assembly of data, identifying the motion signal with other data for transmission via the data link 54.

The synchronization of each of the clocks 52 of the receive stations can be accomplished with a real time and calibration and control network 56. This network 56 will control the frequency and phase of a voltage controlled crystal oscillator 52 serving as the real time clock 52. During a calibration interval, signals received over the wide band data link 54 are used to bring the real time clock 52 into synchronization with the master station real time clock.

FIG. 7 illustrates the organization of the master station. As can be seen, a similar IFF receiver and decoder 68 is provided which will decode the time of arrival data, identity data and any position data contained in a reply from a transponder which is then applied to the message assembler 69.

The real time clock 67 for the master can be used to calibrate the other received station real time clocks. A receive transmit unit 61 is shown for transmitting the calibration data via antenna 60 for the remaining stations of the airport surveillance system over the wideband data link 54. Other wide band receive transmit units 63 and antennas 64 will transmit to the remaining receive station on the airport facility the real time clock data for calibration via other wideband data links.

The Central Processor 66 is therefore provided with data, including the identity and time of arrival information for each reply received from the three (3) stations. Using the time of arrival data, the conventional position determining mathematics permits the determination of the position for each reply received. This position is correlated with the identity data received from the reply.

The MSU Central Processor 66 will provide display data for a conventional airport surveillance radar to permit the identity of each target displayed on the radar to be overlayed on the target.

Thus, there has been described with respect to one embodiment a system for accurately monitoring aircraft which are on the ground in an airport facility. Those skilled in the art will recognize yet other systems as disclosed, but not limited to, the claims attached hereto.

What is claimed is:

1. A system for generating signals which identify aircraft which are on the ground comprising:
an IFF transponder on board said aircraft, having an antenna input for receiving ground initiated interrogation pulse, and issuing a reply transmission in response thereto;
a directional coupler means having one port connected to said transponder antenna input, and two additional ports one of which is connected to an antenna of said aircraft for receiving said interrogation pulses;
a DME suppression circuit for supplying a signal to said IFF transponder for inhibiting replies of said transponder;

landing gear detection means for providing a signal indicating that said aircraft is on the ground; and, circuit means connected to receive said landing gear detection means signal and said DME suppression circuit signal, said circuit means supplying a DME inhibit signal to said IFF transponder and a suppression signal to a remaining port of said directional coupler means to suppress interrogation of said transponder by ground-initiated interrogation pulses, and for introducing interrogation pulses to said IFF transponder at a rate less than the rate of said ground interrogation pulses.

2. The system of claim 1 wherein said landing gear detection means is a weight on wheels switch which changes state when said aircraft is on the ground.

3. The system of claim 1 wherein said circuit means produces interrogation pulses which are at a pseudo randomly varying rate.

4. The system of claim 1 wherein said circuit means produces interrogation pulses for generating a reply which identifies said aircraft.

5. A system for identifying the location of an aircraft which is on the ground, having an IFF transponder, comprising:

means for detecting that said aircraft is on the ground;

means on said aircraft for suppressing interrogation of said IFF transponder from ground interrogation equipment; and, means for generating on board interrogation signals for interrogating said IFF transponder at a rate less than interrogation signals produced by said ground interrogation equipment when said aircraft is on the ground.

6. The system according to claim 5 wherein said on board interrogation signals produce a reply from said aircraft transponder identifying said aircraft.

7. The system according to claim 6 wherein said on board interrogation signals produce an additional reply containing data.

8. The system of claim 5 further comprising a plurality of ground receiving stations for detecting the time of arrival of said reply and for decoding each reply whereby said aircraft's position and identity are determined.

9. The system of claim 5 wherein said reply includes position data generated on board said aircraft.

10. The system of claim 8 further comprising a acceleration detector for increasing the rate of on-board interrogation pulse sets in response to acceleration of said aircraft.

11. The system of claim 10 further comprising means at said receiving stations for detecting the change in the rate of replies produced by said aircraft.

* * * * *